US012771522B2

(12) United States Patent
Tran et al.

(10) Patent No.: US 12,771,522 B2
(45) Date of Patent: Oct. 20, 2026

(54) CANCELLER ADAPTATION GATING

(71) Applicant: Aeonsemi, Inc., Grand Cayman (KY)

(72) Inventors: Ky-Anh Tran, Milpitas, CA (US); Colin Weltin-Wu, Mountain View, CA (US)

(73) Assignee: Aeonsemi, Inc., Grand Cayman (KY)

( * ) Notice: Subject to any disclaimer, the term of this patent is extended or adjusted under 35 U.S.C. 154(b) by 985 days.

(21) Appl. No.: 17/899,172

(22) Filed: Aug. 30, 2022

(65) Prior Publication Data

US 2024/0072988 A1 Feb. 29, 2024

(51) Int. Cl.
*H04L 5/14* (2006.01)

(52) U.S. Cl.
CPC .................................. *H04L 5/1461* (2013.01)

(58) Field of Classification Search
CPC ......... H04L 5/1461; H04B 3/23; H04M 9/082
See application file for complete search history.

(56) References Cited

U.S. PATENT DOCUMENTS 4,131,767 A * 12/1978 Weinstein ................ H04B 3/23 370/291
4,306,116 A * 12/1981 McClure ................ H04M 11/06 379/93.09
5,329,442 A * 7/1994 Moshfegh .............. G05B 13/02 700/29
5,341,382 A * 8/1994 Levitt ................. G06F 11/2236 714/724
5,347,447 A * 9/1994 Kiji ...................... G05B 13/024 700/32
5,465,321 A * 11/1995 Smyth ................. G06F 11/2257 706/20
5,636,213 A * 6/1997 Eastmond ............. H04W 92/02 370/278
6,411,656 B1 * 6/2002 Bors ........................ H04B 3/23 379/406.01
6,459,684 B1 * 10/2002 Conroy ................... H04L 5/023 379/406.01
7,010,025 B1 * 3/2006 Helfenstein .............. H04B 3/03 343/822
7,570,196 B1 * 8/2009 Mower .................. H04B 1/525 342/159
10,447,506 B1 * 10/2019 Farjadrad ................ H04L 25/40

(Continued)

OTHER PUBLICATIONS

F. Beaucoup, "A Novel Loop Stabilisation Technique for Full-Duplex Speakerphones," 2006 Canadian Conference on Electrical and Computer Engineering, Ottawa, ON, Canada, 2006, pp. 771-774. (Year: 2006).*

(Continued)

*Primary Examiner* — Ayaz R Sheikh
*Assistant Examiner* — Tarell A Hampton
(74) *Attorney, Agent, or Firm* — Paradice & Li LLP

(57) ABSTRACT

Methods and apparatus for echo cancelation in full duplex communication systems are disclosed. An example method includes generating data for transmission from the first communication device, generating a transmission signal based on the data for transmission, generating an echo cancelation signal based at least in part on the data for transmission and a received signal from a second communication device, and selectively removing a contribution of the received signal to the echo cancelation signal.

18 Claims, 6 Drawing Sheets

(56) References Cited

U.S. PATENT DOCUMENTS

| | | | | |
|---|---|---|---|---|
| 2008/0304675 | A1* | 12/2008 | Roovers | H04M 9/082 379/406.01 |
| 2011/0110532 | A1* | 5/2011 | Svendsen | H04M 9/082 381/93 |
| 2011/0261863 | A1* | 10/2011 | Chandra | H04M 9/082 375/219 |
| 2018/0234130 | A1* | 8/2018 | Chapman | H04B 3/23 |
| 2020/0153506 | A1* | 5/2020 | Linnartz | H05B 47/1985 |

OTHER PUBLICATIONS

G. Schmidt, "Applications of acoustic echo control—An overview," 2004 12th European Signal Processing Conference, Vienna, Austria, 2004, pp. 9-16. (Year: 2004).*

R. Castello, L. Tomasini, S. Pernici, F. Salerno, M. Mazzucco and M. Ferro, "Analog front end of an ECBM transceiver for ISDN," in IEEE Journal of Solid-State Circuits, vol. 25, No. 6, pp. 1575-1585, Dec. 1990. (Year: 1990).*

Chandra et al., "A full-Duplex 10GBase-T Transmitter Hybrid with SFDR >65dBc Over 1 to 400MHz in 40nm CMOS," 2011 IEEE International Solid-State Circuits Conference, 2011, pp. 144-146, doi: 10.1109/ISSCC.2011.5746256.

Farjad et al., "A 48-Port FCC-Compliant 10GBASE-T Transmitter with Mixed-Mode Adaptive Echo Canceller," in IEEE Journal of Solid-State Circuits, vol. 47, No. 12, pp. 3261-3272, Dec. 2012, doi: 10.1109/JSSC.2012.2216452.

"Session 6, Hot Chips 23 (2011)," Web page <https://www.youtube.com/watch?v=1LHpqNUXd-o>, HC23-S6: Networking, Friday, Aug. 19, 2011.

* cited by examiner

CANCELLER ADAPTATION GATING

TECHNICAL FIELD

Aspects of the present disclosure relate generally to improving signal reception in communication circuits, and more specifically to improving echo cancelation in communication circuits.

BACKGROUND

In control theory, modes of a system are described as observable if, for every possible evolution of state and control vectors, a current state may be estimated using only the information from outputs of the system. Modes which are not observable may be described as unobservable modes.

Many modern circuits transmit and receive one or more analog signals for processing, filtering, amplification, and the like. Such circuits may often operate in full duplex, with signals being transmitted and received over a common medium, such as a wired or wireless medium. One problem which may arise in full duplex communication circuits is the undesirable influence of echoes, for example the undesirable influence of echoes of a transmitted signal on received signals.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

Systems and methods for reducing mode conversion in differential signals are disclosed. One innovative aspect of the subject matter described in this disclosure can be implemented as a mode cancelation circuit coupled to a first communication device. The mode cancelation circuit may include a first terminal to receive data for transmission, a second terminal to receive a signal from a second communication device, a first signal path to receive the data for transmission and generate a transmission signal, a second signal path to receive the data for transmission and generate an echo cancelation signal based at least in part on the data for transmission and the received signal, and an adaptation gating circuit to selectively remove a contribution of the received signal to the echo cancelation signal.

In some aspects, the adaptation gating circuit is configured to remove the contribution of the received signal in response to detecting a notch in a transfer function associated with the second signal path. In some aspects, the notch is detected at a Nyquist frequency of the transfer function. In some aspects, detecting the notch at the Nyquist frequency includes comparing a first value of the transfer function at the Nyquist frequency to a second value of the transfer function at a direct current (DC) frequency. In some aspects, detecting the notch corresponds to determining that the first value divided by the second value is less than a threshold ε. In some aspects, detecting the notch includes determining that the second value is greater than the product of the first value and a predetermined scaling factor.

In some aspects, the adaptation gating circuit includes a multiplexer configured provide either zero or a signal based on the received signal to the second signal path in response to detecting the notch or not detecting the notch, respectively.

In some aspects, the adaptation gating circuit includes a path matching filter configured to align the data for transmission with an echo signal corresponding to the transmission signal. In some aspects, the path matching filter delays the data for transmission to align it with the echo signal.

In some aspects, the echo cancelation signal is configured to remove an echo of the transmission signal from the received signal. In some aspects, the contribution of the received signal is based at least in part on the transmission signal summed with the received signal, minus the echo of the transmission signal.

Another innovative aspect of the subject matter described in this disclosure can be implemented as a method for echo cancelation in a first communication device. In some implementations, the method includes generating data for transmission from the first communication device, generating a transmission signal based on the data for transmission, generating an echo cancelation signal based at least in part on the data for transmission and a received signal from a second communication device, and selectively removing a contribution of the received signal to the echo cancelation signal.

In some aspects, selectively removing the contribution of the received signal to the echo cancelation signal is performed in response to detecting a notch in a transfer function associated with the echo cancelation signal. In some aspects, the notch is detected at a Nyquist frequency of the transfer function. In some aspects, detecting the notch at the Nyquist frequency includes comparing a first value of the transfer function at the Nyquist frequency to a second value of the transfer function at a direct current (DC) frequency. In some aspects, detecting the notch corresponds to determining that the first value divided by the second value is less than a threshold ε. In some aspects, detecting the notch includes determining that the second value is greater than the product of the first value and a predetermined scaling factor.

In some aspects, selectively removing the contribution of the received signal to the echo cancelation signal includes selectively providing either zero or a signal based on the received signal as the contribution of the received signal to the echo cancelation signal.

In some aspects, the echo cancelation signal is configured to remove an echo of the transmission signal from the received signal.

Another innovative aspect of the subject matter described in this disclosure can be implemented as an echo cancelation circuit coupled to a first communication device. An example echo cancelation circuit includes means for generating data for transmission from the first communication device, means for generating a transmission signal based on the data for transmission, means for generating an echo cancelation signal based at least in part on the data for transmission and a received signal from a second communication device, and means for selectively removing a contribution of the received signal to the echo cancelation signal.

BRIEF DESCRIPTION OF THE DRAWINGS

The example implementations described herein are illustrated by way of example and are not intended to be limited by the figures of the accompanying drawings. Like numbers reference like elements throughout the drawings and specification. Note that the relative dimensions of the following figures may not be drawn to scale.

DETAILED DESCRIPTION

Aspects of the present disclosure may be used to improve cancelation of unobservable modes in electronic circuits by selectively gating adaptation of the mode cancelation circuit in response to detection of one or more notches in a transfer function of an observation path associated with the mode cancelation circuit. In some implementations, the unobservable mode may be associated with an echo of a transmission signal which may be removed from a signal received using a common medium with the transmission signal. More particularly, gating the adaptation for such an echo cancelation circuit may include removing a contribution of the received signal to an echo cancelation signal in response to detecting the notch in the transfer function. These and more details of the present disclosure are described in more detail below.

In the following description, numerous specific details are set forth such as examples of specific components, circuits, and processes to provide a thorough understanding of the present disclosure. The term "coupled" as used herein means coupled directly to or coupled through one or more intervening components or circuits. Also, in the following description and for purposes of explanation, specific nomenclature and/or details are set forth to provide a thorough understanding of the example implementations. However, it will be apparent to one skilled in the art that these specific details may not be required to practice the example implementations. In other instances, well-known circuits and devices are shown in block diagram form to avoid obscuring the present disclosure. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The example implementations are not to be construed as limited to specific examples described herein but rather to include within their scope all implementations defined by the appended claims.

Figure 1:
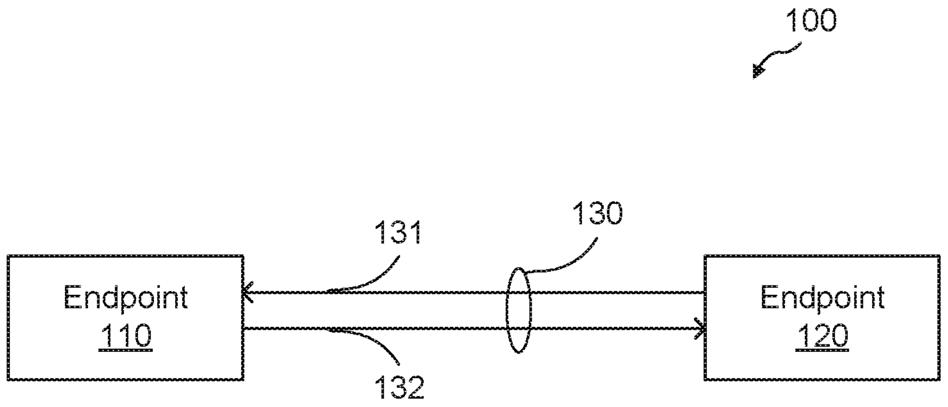
FIG. 1 shows a simplified circuit diagram of a duplex signaling system which may be used with the example implementations.

FIG. 1 shows a simplified circuit diagram of a duplex signaling system 100 which may be used with the example implementations. The duplex signaling system 100 may include an endpoint 110 and an endpoint 120, where the endpoint 110 and the endpoint 120 may communicate via signals sent via a signaling medium 130. For example, the endpoint 110 may receive a signal 131 from the endpoint 120 and transmit a signal 132 to the endpoint 120 via the medium 130. In some examples, the medium 130 may be a full duplex wireline communication medium, such as a twisted copper pair. Such a twisted copper pair may be provided, for example, in a 10 Gigabit Ethernet system operating in accordance with the 10GBASE-T, or the Institute of Electrical and Electronics Engineers (IEEE) 802.3an-2006 standard or corresponding subsequent standards from the IEEE or a similar standard from another similar standards body. In other examples, the medium 130 may be wireless. One problem which may arise with such a duplex signaling system is that received signals may be subject to interference by echoes or other interfering signals relating to transmitted signals. For example, a received signal 131 may include interference from echoes of the transmitted signal 132. Cancelation of such echoes may therefore be desirable for improved functioning of such communication systems.

Figure 2:
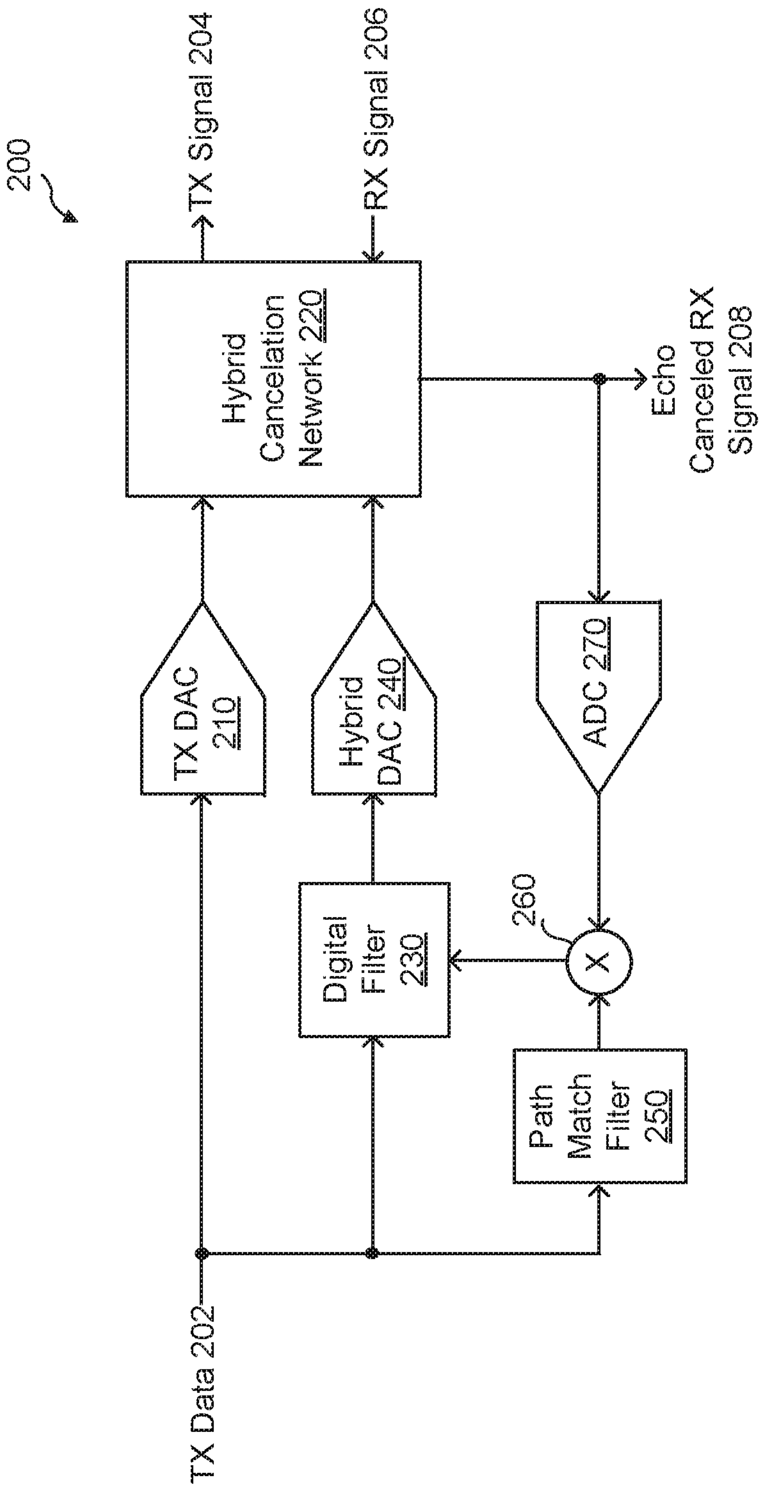
FIG. 2 shows a simplified circuit diagram of an echo cancelation system for a duplex signaling system, such as the duplex signaling system of FIG. 1.

FIG. 2 shows a simplified circuit diagram of an echo cancelation system 200 for a duplex signaling system, such as the duplex signaling system 100 of FIG. 1. The echo cancelation system 200 receives transmit (TX) data 202 and receive (RX) signal 206 as inputs, and outputs a TX signal 204 and an echo canceled RX signal 208. The echo cancelation system 200 of FIG. 2 is configured to remove echoes of the TX data 202 from the RX signal 206. The TX data is provided to a TX digital to analog converter (DAC) 210, and thence to a hybrid cancelation network 220, which outputs the TX signal 204 and the echo canceled RX signal 208. The TX data 202 is also provided to a digital filter 230 and a path match filter 250. The output of the digital filter 230 is provided to a hybrid DAC 240 and thence to the hybrid cancelation network 220. The echo canceled RX signal is output from the hybrid cancelation network 220 to an analog to digital converter (ADC) 270 and from there to a multiplier 260. The multiplier 260 receives the output from the path match filter 250 and the ADC 270 and provides a feedback signal to the digital filter.

The echo cancelation system 200 operates to remove echoes of the TX signal 204 from the RX signal 206. More particularly, the hybrid cancelation network 220 is configured to separate the RX signal 206 from the TX signal 204 by subtracting the output of the hybrid DAC 240 from the TX signal 204.

Figure 3:
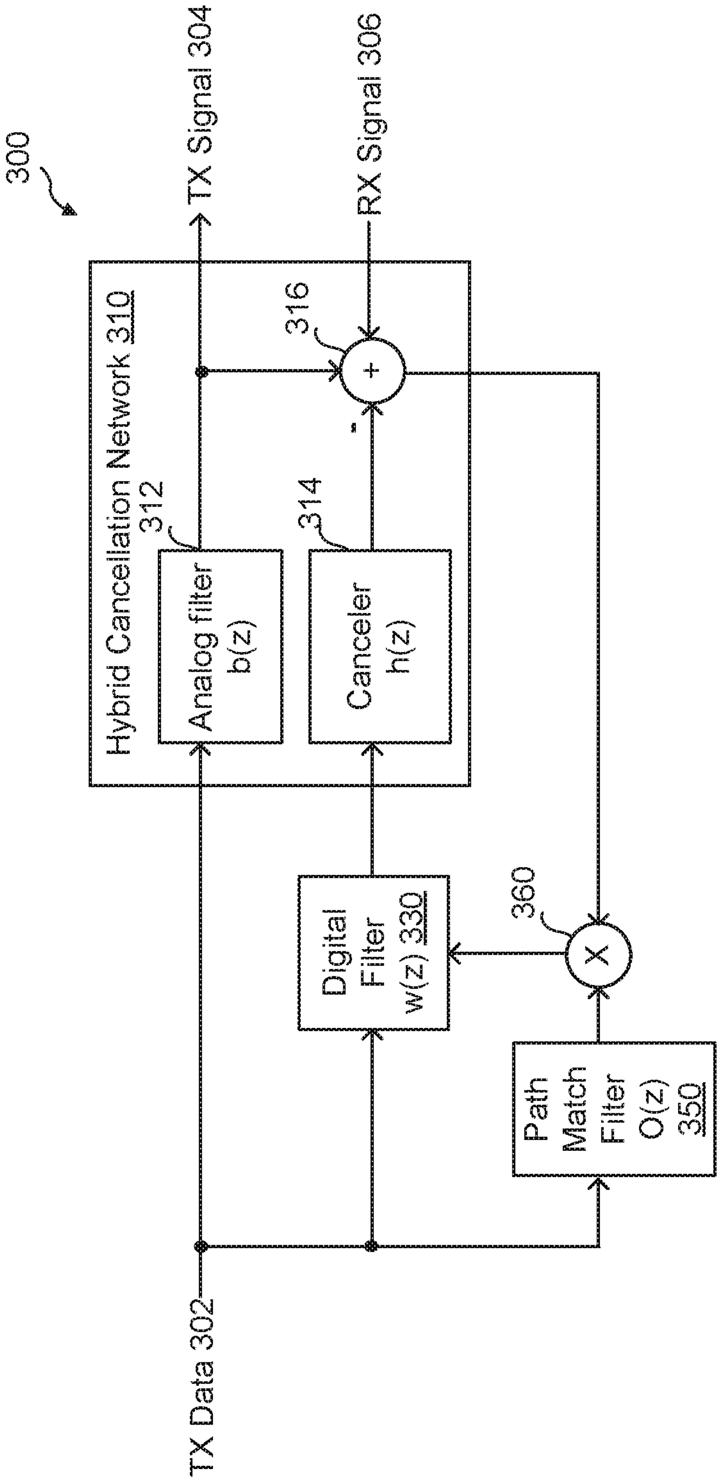
FIG. 3 is a block diagram showing a signal processing view of the echo cancelation system of FIG. 2.

FIG. 3 is a block diagram 300 showing a signal processing view of the echo cancelation system 200 of FIG. 2. The block diagram 300 depicts the echo cancelation operations of the echo cancelation system 200 more mathematically. Similarly to echo cancelation system 200, the block diagram 300 receives TX data 302 and an RX signal 306, and outputs a TX signal 304. Note that the output of the echo canceled RX signal is omitted for simplicity. The hybrid cancelation network 310 receives the TX data 302 and is shown to filter the TX data 302 with an analog filter 312, characterized by an echo transfer function b(z). B(z) is a transfer function representing the echo of the TX signal 304 introduced into the RX signal 306—the echo to be canceled by system depicted in FIG. 3. The TX data 302 is also provided to digital filter 330 and path match filter 350. The digital filter 330 is a digital filter, called w(z), which shapes the response to match the transmit echo to aid in echo cancelation by the hybrid cancelation network 310. The path match filter, shown as O(z), is configured to align the TX data 302 with the echo response of the TX data 302 to aid the digital filter w(z) in correlating the two in order to aid echo cancelation. The output of the digital filter 330 is provided to hybrid cancelation network 310. More particularly, FIG. 3 shows the output of the digital filter 330 to be filtered by a canceler

314, having a transfer function called h(z) and representing an observation path of the echo cancelation of the hybrid cancelation network 310. The output of the canceler 314 is then subtracted from a sum of the output of the analog filter 312 and the RX signal 306 using a summer 316. The output of the summer 316 is then provided to a multiplier 360 which also received the output of the path match filter 350, providing an output to the digital filter 330.

In some aspects, the observation path h(z) may have a transfer function which is not simply an impulse response. Represented mathematically, the purpose of the echo cancelation systems depicted in FIGS. 1-2 is to set h(z)*w(z)=b(z). However, such systems are badly behaved when h(z) includes notches where b(z) does not. Such notches may commonly appear as a full duplex system's ADC sampling phase shifts to track an RX signal. Such notches are undesirable because the adapted solution for the filter w(z), such as the digital filter 230 or the digital filter 330 of FIGS. 1-2, respectively, is given by w(z)=b(z)/h(z). As such, if h(z) includes a notch where b(z) does not, the notch in the denominator may lead to a badly behaved filter response, which may impair echo cancelation. At frequencies where h(z) has a notch, the observation path h(z) may be described as having an unobservable mode. More particularly, beyond reduced echo cancelation performance, this may result in very large coefficients for w(z) at the notch frequencies, which may cause signal saturation in the digital domain, as well as a large time domain signal in the signal path which may cause saturation in the analog domain.

Represented another way, the convolution of h(z) and w(z) may be represented as a convolution matrix H. The adaptation problem corresponding to the echo cancelation may therefore be described as minimizing the mean squared residual error expressed as $|e|^2=|Hw-b|^2$. The solution to this problem may be determined, for example using an adaptive loop, and may be expressed as $w^*=(H^TH)^{-1}H^Tb$.

The example implementations detect a presence of such a notch in h(z) and counter the influence of this unobservable mode by gating adaptation of the echo cancelation system. More particularly, Applicants have found that such notches typically appear at a Nyquist frequency, for example at a Nyquist frequency for a reasonable low-pass filtered response to h(z).

Figure 4:
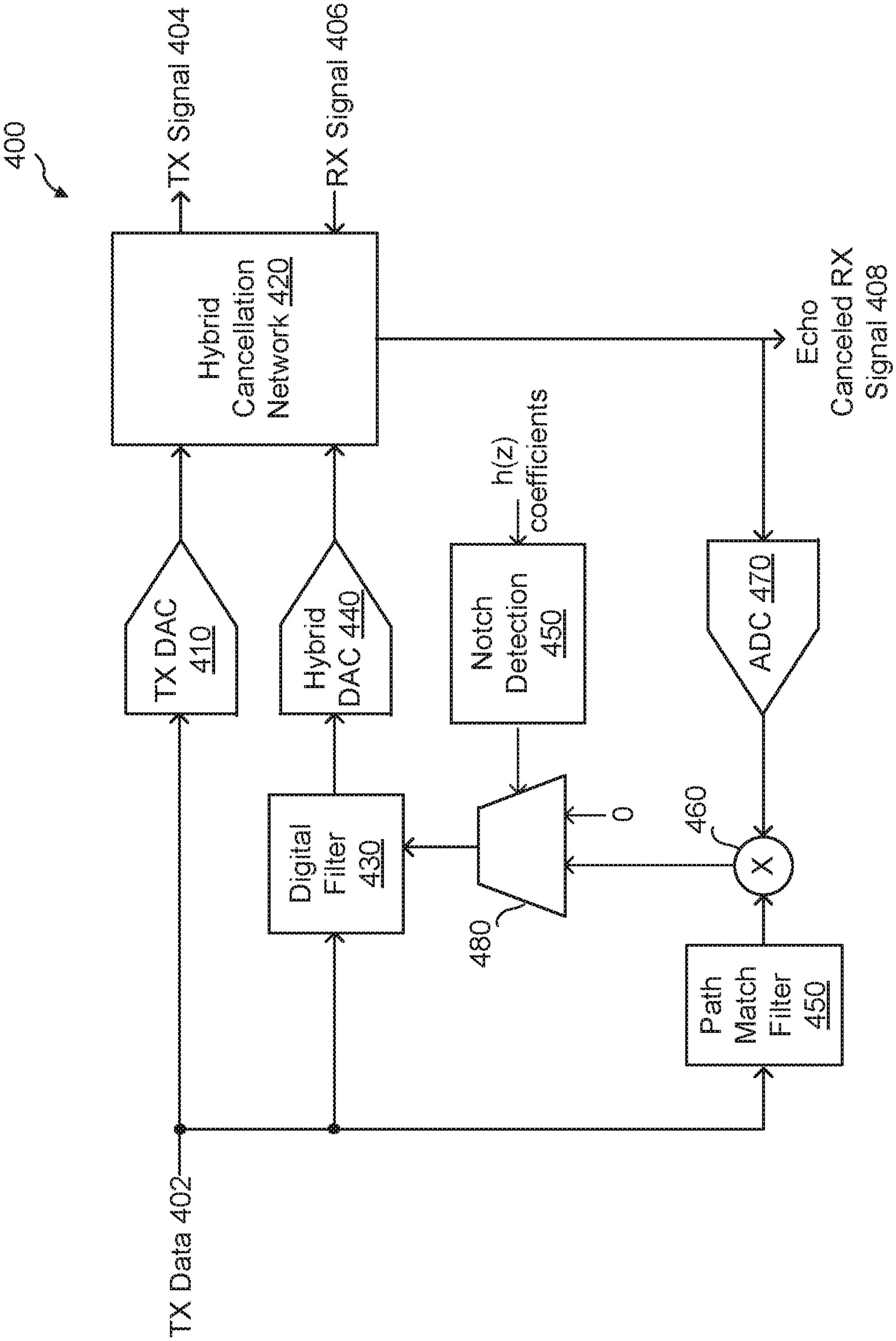
FIG. 4 shows an example echo cancelation system, according to some implementations.

FIG. 4 shows an example echo cancelation system 400, according to some implementations. The echo cancelation system 400 is similar to the echo cancelation system 200 of FIG. 2 but includes notch detection and gate adaptation in order to detect and remove the influence of unobservable modes corresponding to notches in h(z). The echo cancelation system 400 receives TX data 402 and RX signal 406, and outputs TX signal 404 and echo canceled RX signal 408. The TX data 402 is provided to a TX DAC 410 and thence to a hybrid cancelation network 420. The TX data 402 is also provided to a digital filter 430, and thence to hybrid DAC 440 and the hybrid cancelation network 420. The TX data is also provided to patch match filter 450. The echo canceled RX signal 408 is output from the hybrid cancelation network 420 and provided to ADC 470. The outputs of the path match filter 450 and the ADC 470 are provided to multiplier 460.

The hybrid cancelation network 420 has a similar structure to the hybrid cancelation network 220 and the hybrid cancelation network 310. Coefficients of the observation path transfer function h(z) of the hybrid cancelation network 420 may be provided to a notch detection module 450, which may detect a notch in h(z) corresponding to an unobservable mode at a Nyquist frequency, as discussed in more detail below. In response to detecting, or not detecting, a notch in h(z), a control signal may be sent to a multiplexer 480, selecting either the output of multiplier 460, or a predetermined value, such as zero, for feedback into the digital filter 430.

Let h[n] represent the filter coefficients for the observation path. Then, $H(z)=\Sigma_n h[n]z^{-n}$. At an angular frequency Ω, H(z) may be represented as $H(e^{j\Omega})$. Thus, the gain at the Nyquist frequency may be given as $H(e^{j\pi})=\Sigma_{n=even}h[n]-\Sigma_{n=odd}h[n]$, and the DC gain may be given as $H(e^{j0})=\Sigma_{n=even}h[n]+\Sigma_{n=odd}h[n]$. One method for detecting a notch may be to select a threshold ratio between the Nyquist gain and the DC gain. In other words, selecting some ε such that $$\frac{|H(e^{j\pi})|}{|H(e^{j0})|}<\varepsilon.$$

However, computing a ratio between the Nyquist gain and the DC gain may be computationally costly, and thus it may be more advantageous to detect the notch differently. One more hardware-friendly method may be to detect the notch in response to $$|H(e^{j0})|>\frac{1}{\varepsilon}\left|H(e^{j\pi})\right|.$$

In some aspects, 1/ε may have a predetermined value stored in one or more registers or other memories coupled to the notch detection module. In some other aspects, this predetermined value may be computed based on one or more coefficients stored in the one or more registers or other memories coupled to the notch detection module.

Figure 5:
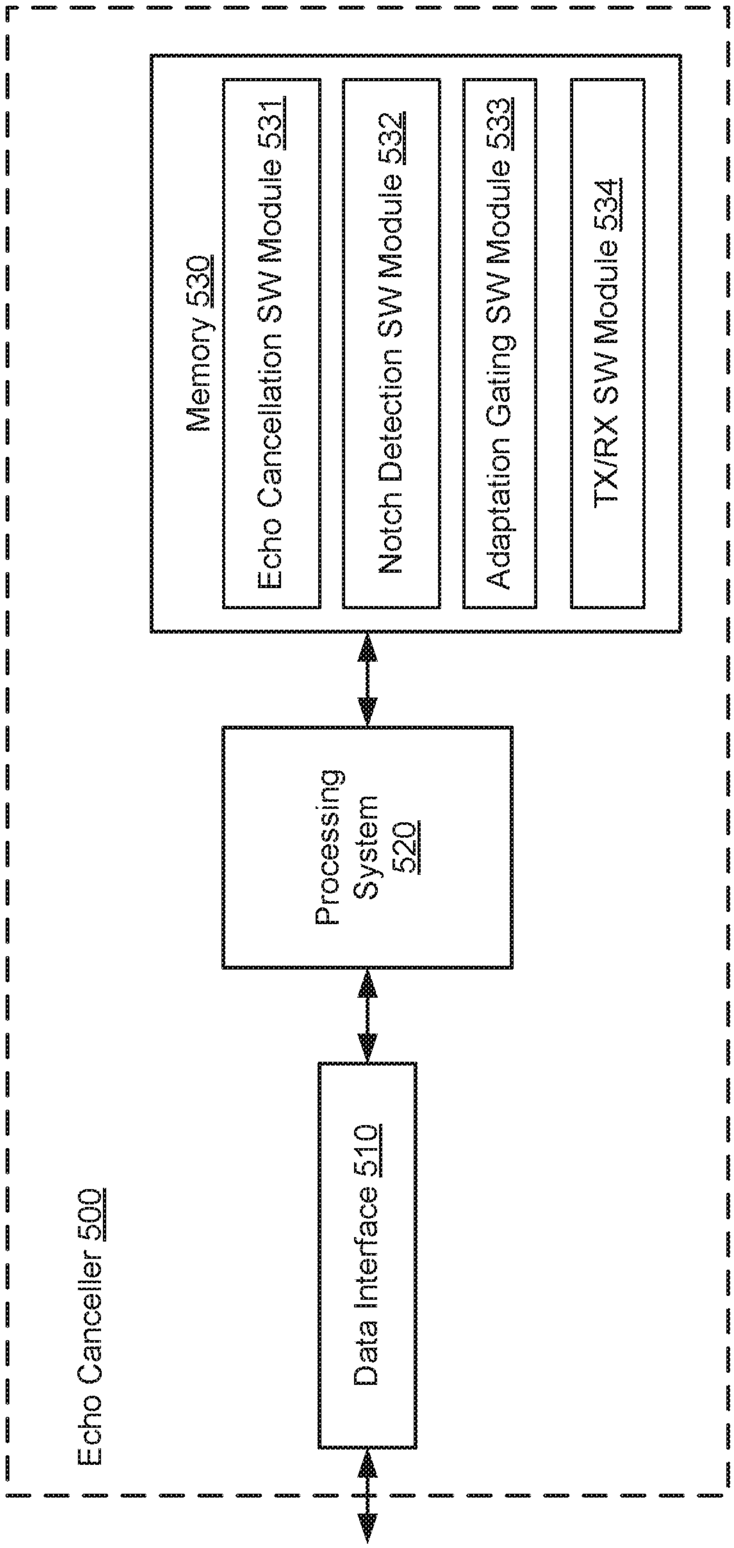
FIG. 5 shows a block diagram of an echo canceler, according to some implementations.

FIG. 5 shows a block diagram of an echo canceler 500, according to some implementations. In some implementations, the echo canceler 500 may be one example of the echo cancelation system 400 of FIG. 4.

In some implementations, the echo canceler 500 may include a data interface 510, a processing system 520, and a memory 530. The data interface 510 is configured to transmit and receive signals.

The memory 530 may include a non-transitory computer-readable medium (including one or more nonvolatile memory elements, such as EPROM, EEPROM, Flash memory, a hard drive, and the like) that may store at least the following software (SW) modules:

An echo cancelation SW module 531 to cancel undesired echoes of a transmission signal in signals received by the echo canceler 500;

- a notch detection SW module 532 to detect a presence of notches in a transfer function h(z) of an observation path of the echo canceler 500;
- an adaptation gating SW module 533 to selectively gate a contribution of signals received at the echo canceler 500 to echo cancelation operations performed at the echo canceler 500; and
- a TX/RX SW module 534 to generate data and signals for transmission and process data and signals for reception by the echo canceler 500.

Each software module includes instructions that, when executed by the processing system 520, causes the echo canceler 500 to perform the corresponding functions.

The processing system 520 may include any suitable one or more processors capable of executing scripts or instructions of one or more software programs stored in the echo canceler 500 (such as in memory 530). For example, the processing system 520 may execute the echo cancelation SW module 531 to cancel undesired echoes of a transmission signal in signals received by the echo canceler 500. The processing system 520 also may execute the notch detection SW module 532 to detect a presence of notches in a transfer function h(z) of an observation path of the echo canceler 500. Further, the processing system 520 may execute the imbalance compensation SW module 533 to selectively gate a contribution of signals received at the echo canceler 500 to echo cancelation operations performed at the echo canceler 500. Further, the processing system 520 may execute the TX/RX SW module 534 to generate data and signals for transmission and process data and signals for reception by the echo canceler 500

Figure 6:
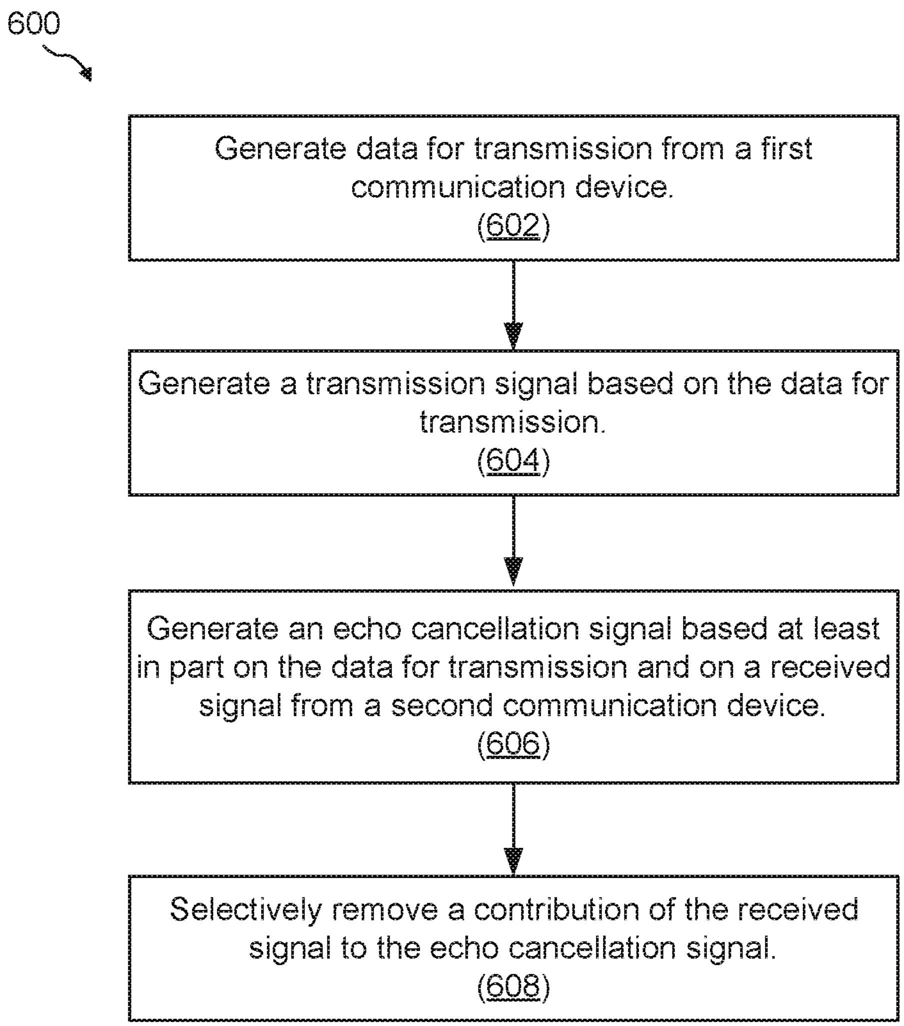
FIG. 6 shows an illustrative flowchart depicting an example operation for echo cancelation in a communication circuit, according to some implementations.

FIG. 6 shows an illustrative flowchart depicting an example operation 600 for echo cancelation in a communication circuit, according to some implementations. The operation 600 may be used to operate the echo cancelation circuit 400 of FIG. 4 or any other feasible circuit configured to identify and remove echoes of transmitted signals from signals received at a single full-duplex communication system.

The operation 600 may begin with generating data for transmission from a first communication device (602). In some implementations, a means for generating the data for transmission may include the processing system 520 executing the TX/RX SW module 534 of FIG. 5.

The operation 600 may proceed with generating a transmission signal based on the data for transmission (604). In some implementations, a means for generating the transmission signal may include the TX DAC 410 and the hybrid cancelation network 420 of FIG. 4, or the processing system 520 executing the TX/RX SW module 534 of FIG. 5.

The operation 600 may proceed with generating an echo cancelation signal based at least in part on the data for transmission and on a received signal from a second communication device (606). In some implementation, a means for generating the echo cancelation signal may include the hybrid cancelation network 420, the digital filter 430, the hybrid DAC 440, the path match filter 450, the multiplier 460, and the ADC 470 of FIG. 4, or the processing system 520 executing the echo cancelation SW module 531 or the notch detection SW module 532 of FIG. 5.

In some aspects, selectively removing the contribution of the received signal to the echo cancelation signal in block 608 is performed in response to detecting a notch in a transfer function associated with the echo cancelation signal. In some aspects, the notch is detected at a Nyquist frequency of the transfer function. In some aspects, detecting the notch at the Nyquist frequency includes comparing a first value of the transfer function at the Nyquist frequency to a second value of the transfer function at a direct current (DC) frequency. In some aspects, detecting the notch corresponds to determining that the first value divided by the second value is less than a threshold $\varepsilon$. In some aspects, detecting the notch includes determining that the second value is greater than the product of the first value and a predetermined scaling factor.

In some aspects, selectively removing the contribution of the received signal to the echo cancelation signal in block 608 includes selectively providing either zero or a signal based on the received signal as the contribution of the received signal to the echo cancelation signal.

In some aspects, the echo cancelation signal is configured to remove an echo of the transmission signal from the received signal.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM latch, flash latch, ROM latch, EPROM latch, EEPROM latch, registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor.

In the foregoing specification, the example implementations have been described with reference to specific example implementations thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. An echo cancelation circuit coupled to a first communication device, comprising:

- a first terminal to receive data for transmission;
- a second terminal to receive a signal from a second communication device;
- a first signal path to receive the data for transmission and generate a transmission signal;
- a second signal path to receive the data for transmission and generate an echo cancelation signal based at least in part on the data for transmission and the received signal;
- a notch detection module configured to detect notches in a transfer function associated with the second signal path; and
- an adaptation gating circuit to selectively remove a contribution of the received signal to the echo cancelation signal based on whether a notch is detected by the notch detection module.

2. The echo cancelation circuit of claim 1, wherein the notch detection module is configured to detect notches in the transfer function at a Nyquist frequency of the transfer function.

3. The echo cancelation circuit of claim 2, wherein the detecting of notches at the Nyquist frequency comprises comparing a first value of the transfer function at the Nyquist frequency to a second value of the transfer function at a direct current (DC) frequency.

4. The echo cancelation circuit of claim 3, wherein the detecting of notches further comprises determining whether the first value divided by the second value is less than a threshold E.

5. The echo cancelation circuit of claim 3, wherein the detecting of notches further comprises determining whether the second value is greater than a product of the first value and a predetermined scaling factor.

6. The echo cancelation circuit of claim 1, wherein the adaptation gating circuit comprises a multiplexer configured to provide either zero or a signal based on the received signal to the second signal path in response to detecting the notch, or not detecting the notch, respectively.

7. The echo cancelation circuit of claim 1, wherein the adaptation gating circuit further comprises a path matching filter configured to align the data for transmission with an echo signal corresponding to the transmission signal.

8. The echo cancelation circuit of claim 7, wherein the path matching filter delays the data for transmission to align it with the echo signal.

9. The echo cancelation circuit of claim 1, wherein the echo cancelation signal is configured to remove an echo of the transmission signal from the received signal.

10. The echo cancelation circuit of claim 9, wherein the contribution of the received signal is based at least in part on the transmission signal summed with the received signal, minus the echo of the transmission signal.

11. A method for echo cancelation in a first communication device, the method comprising:

- generating data for transmission from the first communication device;
- generating a transmission signal based on the data for transmission;
- generating an echo cancelation signal based at least in part on the data for transmission and a received signal from a second communication device;
- determining whether a transfer function associated with the echo cancellation signal includes a notch; and
- selectively removing a contribution of the received signal to the echo cancelation signal based on whether the transfer function includes a notch.

12. The method of claim 11, wherein the determining of whether the transfer function includes a notch comprises detecting the notch at a Nyquist frequency of the transfer function.

13. The method of claim 12, wherein detecting the notch at the Nyquist frequency comprises comparing a first value of the transfer function at the Nyquist frequency to a second value of the transfer function at a direct current (DC) frequency.

14. The method of claim 13, wherein detecting the notch corresponds to determining that the first value divided by the second value is less than a threshold E.

15. The method of claim 13, wherein detecting the notch comprises determining that the second value is greater than a product of the first value and a predetermined scaling factor.

16. The method of claim 11, wherein the adaptation gating circuit comprises a multiplexer configured to provide either zero or a signal based on the received signal as the contribution of the received signal to the echo cancelation signal.

17. The method of claim 11, wherein the echo cancelation signal is configured to remove an echo of the transmission signal from the received signal.

18. An echo cancelation circuit coupled to a first communication device, comprising:

- means for generating data for transmission from the first communication device;
- means for generating a transmission signal based on the data for transmission;
- means for generating an echo cancelation signal based at least in part on the data for transmission and a received signal from a second communication device;
- means for determining whether a transfer function associated with the echo cancellation signal includes a notch; and
- means for selectively removing a contribution of the received signal to the echo cancelation signal based on whether the transfer function includes a notch.

* * * * *